Nov. 4, 1947.  H. C. JOHNSON  2,430,020
SPREADER FOR FERTILIZERS AND THE LIKE
Filed Jan. 15, 1944  3 Sheets-Sheet 3

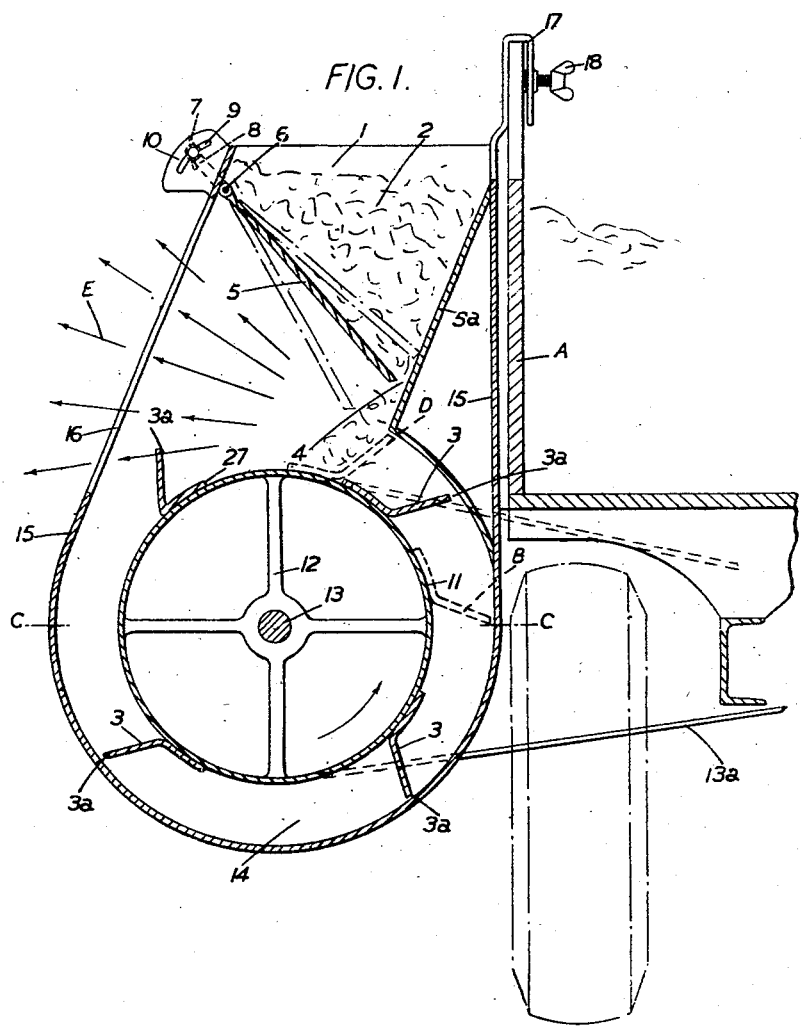

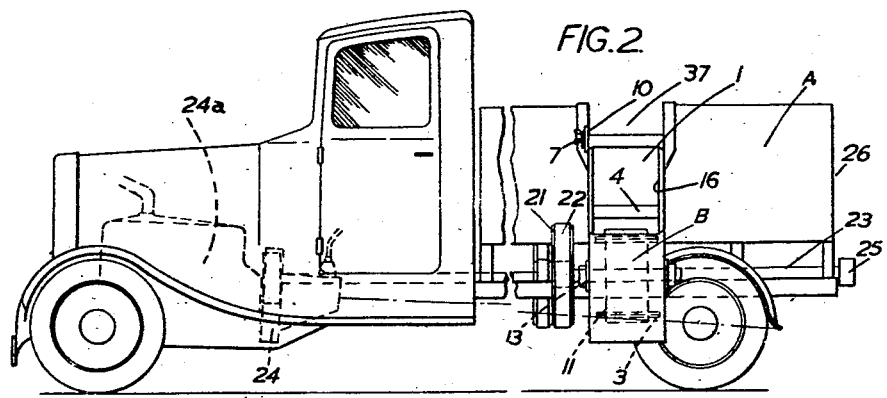
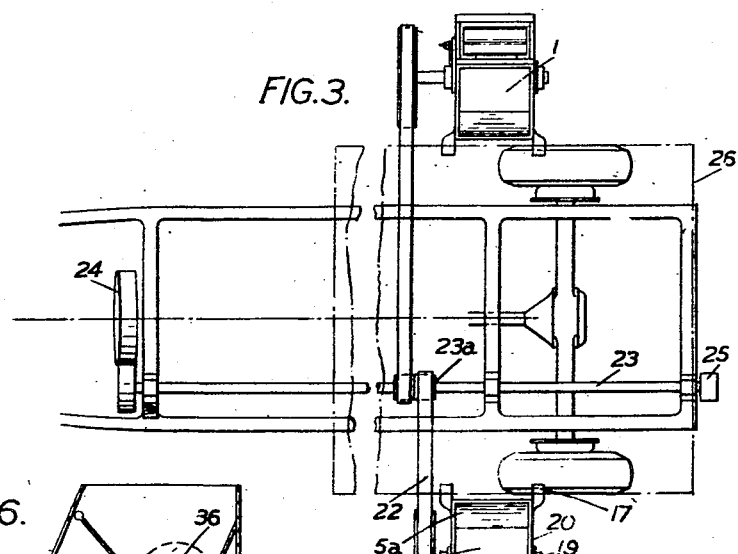
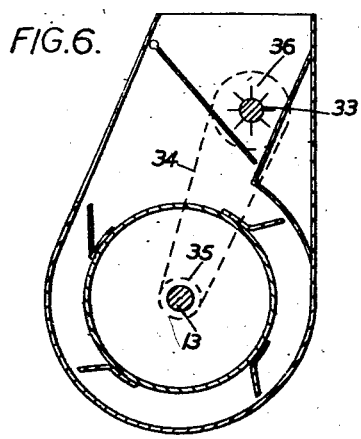
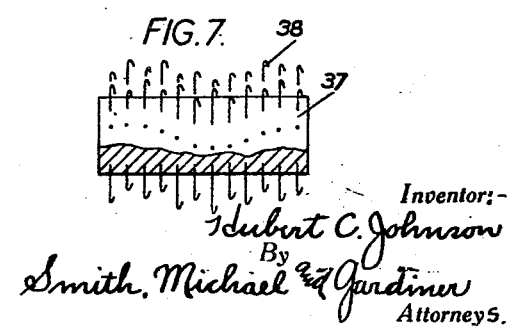

Inventor:-
Hubert C. Johnson,
By
Smith, Michael and Gardiner
Attorneys.

Patented Nov. 4, 1947

2,430,020

UNITED STATES PATENT OFFICE 2,430,020

SPREADER FOR FERTILIZERS AND THE LIKE

Hubert C. Johnson, Thakeham, Pulborough, England

Application January 15, 1944, Serial No. 518,439
In Great Britain April 9, 1943

5 Claims. (Cl. 275—8)

This invention relates to a spreader of fertilisers such as lime and to a drawn or propelled machine for spreading such fertilisers.

According to the present invention there is provided a spreader for fertilisers which comprises a series of rotatable coaxial vanes mounted at the discharge end of a feeding mechanism arranged to receive a charge of fertiliser, for example lime, and deliver the same to the said vanes from a position of greater radial distance from the rotational axis of the said vanes than the distance of the free coaxial edges of the vanes from the said axis, the arrangement being such that in operation the vanes move from a lower to a higher level prior to meeting the flow of fertiliser from the feeding mechanism.

Again according to the present invention there is provided a spreader for fertilisers which comprises a series of rotatable coaxial vanes mounted at the discharge end of a feeding mechanism arranged to receive a charge of fertiliser, for example lime, and deliver the same to the said vanes from a position of greater radial distance from the rotational axis of the same vanes than the distance of the free coaxial edges of the vanes from the said axis, the arrangement being such that the vanes are rotatable in such a manner that in operation they meet the fertiliser above a horizontal plane extending through the rotational axis of the vanes and discharge the fertiliser from above said plane.

The spreaders which are set forth in the last two preceding paragraphs consist of units which are easily attached and operatively connected to a vehicle normally employed for transport purposes, such as a lorry, in a simple and inexpensive manner and enables the possessor of such a spreader to fertilise land in a very simple and efficient manner without involving the use of highly expensive machinery.

Further according to the present invention there is provided a machine for spreading fertilisers which comprises a carriage having supported thereon a series of rotatable coaxial vanes mounted at the discharge end of a feeding mechanism arranged to receive a charge of fertiliser, for example lime, and deliver the same to the said vanes from a position of greater radial distance from the rotational axis of the said vanes than the distance of the free coaxial edges of the vanes from the said axis, the arrangement being such that in operation the vanes are rotatable so as to throw the fertiliser in a direction transverse to the direction of movement of the carriage.

Again according to the present invention there is provided a machine for spreading fertilisers which comprises a carriage having supported thereon a series of rotatable coaxial vanes mounted at the discharge end of a feeding mechanism arranged to receive a charge of fertiliser, for example lime, and deliver the same to the said vanes from a position of greater radial distance from the rotational axis of the said vanes than the distance of the free coaxial edges of the vanes from the said axis, the arrangement being such that in operation each vane moves from a lower to a higher level prior to meeting the flow of the fertiliser whereupon the fertiliser is thrown by the vane clear of said carriage.

Further according to the present invention there is provided a machine for spreading fertilisers which comprises a carriage having supported thereon a series of rotatable coaxial vanes mounted at the discharge end of a feeding mechanism arranged to receive a charge of fertiliser, for example lime, and deliver the same to the said vanes from a position of greater radial distance from the rotational axis of the said vanes than the distance of the free coaxial edges of the vanes from the said axis, the arrangement being such that in operation each vane meets the fertiliser above a horizontal plane extending through the rotational axis of the vanes and discharges the fertiliser from above said plane so as to throw the fertiliser clear of the said carriage.

The machine which constitutes the subject matter of the last three preceding paragraphs is one that enables large quantities of fertiliser such as lime to be spread in a comparatively short space of time particularly when the machine is designed to throw the fertiliser in a direction transverse to the direction of movement of the carriage. In the case where the machine is particularly designed so that the vanes travel prior to meeting the fertiliser in an upward direction or where the vanes meet the fertiliser above a horizontal plane extending through the rotational axis of the vanes and discharges the fertiliser from above said plane, it will be observed that the fertiliser is struck by the vanes prior to being distributed and is therefore broken up to the maximum extent thus avoiding large lumps being deposited upon the ground possibly leaving patches upon which no fertiliser is distributed.

The invention will now be particularly described with reference to the specific embodiments illustrated in the accompanying drawings, in which:

Figure 1 illustrates a sectional side view of a spreader for fertilisers constructed in accordance with this invention and shown mounted upon the side of a carriage constructed in the form of a lorry body;

Figure 2 illustrates a machine for spreading fertilisers constructed in accordance with this invention, in which a spreader is supported upon a carriage in the form of a lorry and operatively connected to the drive of the said lorry;

Figure 3 is a part plan view of a machine for spreading fertilisers constructed in accordance with this invention in which a pair of spreaders for fertilisers are mounted upon a carriage in the form of a lorry with the spreaders operatively connected to the drive of the lorry;

Figure 6 illustrates a modified form of spreader constructed in accordance with this invention and having a brush operable to ensure an even flow of fertiliser from the feeding mechanism to the vanes; and Figure 7 illustrates a side view of one form of brush for use in connection with the spreader illustrated in Figure 6.

Figure 4:
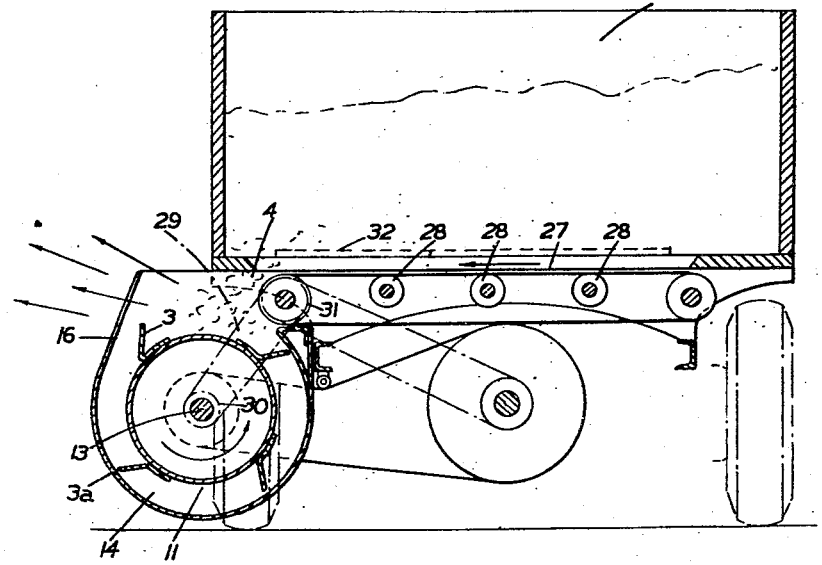
Figures 4 and 5 illustrate in elevation and plan a machine for spreading fertilisers constructed according to this invention, wherein the feeding mechanism comprises a conveyor arranged to feed the fertiliser to the vanes of the machine.

Referring to Figure 1 of the drawings, there is illustrated in sectional elevation a spreader for fertilisers which comprises a series of rotatable coaxial vanes 3 mounted at the mouth 4 of a feeding mechanism 1 in the form of a hopper arranged to receive a charge of fertiliser 2, for example a charge of lime, and deliver the same from the mouth 4 of the hopper 1 to the vanes 3 from the position of the mouth 4, which is of greater radial distance from the rotational axis of the vanes 3 than the distance of the free coaxial edges 3ª of the vanes 3 from the said axis, the arrangement being such that the vanes move from a lower level (that is from, for example, the dotted position B (Figure 1) just above the horizontal plane C—C extending through the rotational axis of the vanes) to a higher level (for example the dotted position D (Figure 1) prior to meeting the flow of fertiliser from the mouth 4 of the hopper. Further each vane meets the flow of fertiliser whilst travelling in a direction transverse to the direction of the flow of the fertiliser which is clearly illustrated in the dotted position D of the vane in Figure 1.

Further it will be observed that in the arrangement illustrated in Figure 1 the vanes 3 are rotatable relatively to the direction of feed of the fertiliser so that each vane (for example in the dotted position D illustrated in Figure 1) meets the fertiliser above the horizontal plane C—C extending through the rotational axis of the vanes and discharges the fertiliser from above said plane as is clearly shown by the arrows E (Figure 1).

The rate at which the fertiliser 2 is discharged from the hopper 1 may be varied by mounting one wall 5 of the hopper 1 upon a pivot 6 so that the area of the mouth 4 of the hopper may be varied. The wall 5 of the hopper may be locked in the desired position by any suitable means, for example by a butterfly nut 7 connected to a bolt secured to an extension 8 of the side wall 5 of the hopper and working in a slot 9 formed in a locking plate 10 fixed to the hopper.

The vanes 3 are mounted upon a rotor cylinder 11 which is carried through the medium of a spider 12 upon a spindle 13. The vanes 3 and the cylinder 11 are housed in a substantially cylindrical casing 14 in such a manner as to provide sufficient clearance between the tips of the vanes and the casing to permit the vanes to rotate freely. The casing 14 is provided with an upwardly extending portion 15 in which is housed the hopper 1. The upwardly extending portion 15 is provided with a discharge opening 16 through which the fertiliser issuing from the mouth 4 of the hopper is thrown in the direction of the arrows E (Figure 1) as the vanes 3 rotate. The wall of the casing remote from the discharge opening 16 is provided at its free end with an overhanging portion 17 provided with a thumb screw 18 for a purpose hereinafter specified.

The spreader illustrated in Figure 1 may be mounted upon a carriage A so that it may be drawn over the surface to be spread with fertiliser. The spindle 13 of the spreader may be connected by the belt 13ª to means which ensures that as the carriage A is drawn over the surface of the land the vanes are rotated so as to spread the fertiliser in a manner hereinbefore set forth.

Referring to Figures 2 and 3 of the drawings there is illustrated a pair of spreaders, similar to the spreader illustrated in Figure 1, mounted upon a lorry and operatively connected to the drive thereof so as to provide a machine for spreading fertiliser which comprises a carriage A in the form of a lorry having supported thereon a series of rotatable coaxial vanes 3 mounted at the mouth 4 of a feeding mechanism in the form of a hopper 1 arranged to receive a charge of fertiliser, for example lime and deliver the same to the said vanes 3 from a position of greater radial distance from the rotational axis of said vanes (Figure 1) than the distance of the coaxial free edges 3ª of said vanes from the said axis, the arrangement being such that the vanes 3 are rotatable (as the power unit 24ª of the lorry is driven) so as to throw the fertiliser in a direction transverse to the direction of movement of the carriage.

Further it will be observed from the specific description of Figures 2 and 3, that there is provided a machine for spreading fertilisers which comprises a carriage in the form of a lorry A having supported thereon a series of rotatable coaxial vanes 3 mounted at the mouth 4 of a feeding mechanism in the form of a hopper 1 arranged to receive a charge of fertiliser, for example lime, and deliver the same to the said vanes 3 from a position of greater radial distance from the rotational axis of the said vanes (Figure 1) than the distance of the coaxial free edges 3ª of the vanes from the said axis, the arrangement being such that the vanes 3 are rotatable in such a manner that each vane moves from a lower level (that is, for example, from the dotted position 13, Figure 1, above the horizontal plane C—C extending through the rotational axis of the vanes) to a higher level (for example, the dotted position D, Figure 1) prior to meeting the flow of fertiliser from the discharge end of the hopper 1 whereupon it throws the fertiliser clear of said carriage.

Again it will be obvious to any one skilled in the art that in the construction described with reference to Figures 2 and 3 there is provided a machine for spreading fertilisers which comprises a carriage A in the form of a lorry having supported thereon a series of rotatable coaxial vanes 3 mounted at the mouth 4 of a feeding mechanism in the form of a hopper 1 arranged to receive a charge of fertiliser, for example lime, and deliver the same to the said vanes 3 from a position of greater radial distance from the rotational axis of the said vanes (Figure 1) than the distance of the free coaxial edges 3ª of the vanes from the said axis, the arrangement being such that the vanes 3 are rotatable so that each vane 3 meets the fertiliser (for example in the dotted position D, Figure 1), above a horizontal plane C—C extending through the rotational axis of the vanes 3 and discharges the fertiliser (for example, in the direction of the arrows C, Figure 1) from above said plane so as to throw the fertiliser clear of the said carriage A.

In the arrangement illustrated in Figures 2 and 3, the spindle 13 which carries the cylinder 11 is mounted in bearings 19 carried in the side walls 20 of the casing 14. The spindle 13 has mounted upon one end thereof a pulley 21 which is connected by means of a belt 22 to a pulley 23ª carried upon an auxiliary shaft 23 driven from the flywheel 24 of a power unit in the form of an engine 24ª. The shaft 23 may be provided with a pulley 25 which extends from the rear of the lorry and is operable to drive one or two spreaders mounted at the rear of the carriage, for example upon the tail board 26 of the lorry. When two spreaders are mounted upon the lorry they may be mounted on either side of the carriage as shown in Figures 2 and 3 or they can be mounted back to back at the rear of the carriage so as to throw the fertiliser in a direction transverse to the normal forward direction of movement of the carriage.

Practically any standard lorry may, according to this invention, be converted into a machine for spreading fertilisers by fitting the two overhanging portions 17 of the spreader illustrated in Figure 1 over the lorry side and fixing the same in position by means of the thumb screw 18, or the spreader may be supported by angle brackets bolted on to the chassis of a carriage from which the spreader is suspended on two lugs. In each case, the spindle 13 carrying the cylinder 11 upon which the vanes are mounted can be operatively connected to the drive of the lorry in a very simple and efficient manner as is clearly illustrated in Figures 2 and 3.

The side of the lorry body is preferably provided with a cut-away portion 37, Figure 2, at the top where the spreader is fitted in order that the fertiliser may be fed from a bulk supply accommodated in the body of the lorry into the hopper 1 by manual labour. Where the spreader is suspended from the underside of the lorry body, a suitably sized hole is cut in the floor of the lorry body and the fertiliser is fed from a bulk supply accommodated in the body of the lorry through the same.

Figure 5:
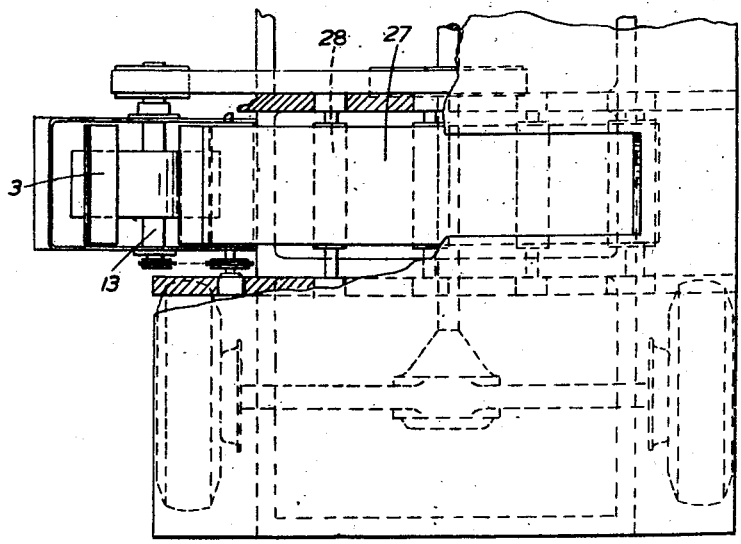

Referring to Figures 4 and 5, there is shown a modified form of machine for spreading fertilisers in which the spreading unit is substantially the same in operation, so far as the spreading operation is concerned, as the spreader illustrated in Figure 1, but whereas the fertiliser is fed to the vanes 3 in the arrangement illustrated in Figure 1 by means of a hopper, the feeding mechanism in the arrangement illustrated in Figures 4 and 5 comprises a conveyor 27 mounted in the floor of a carriage so as to travel in a direction transverse to the normal direction of movement of the carriage to feed a supply of fertiliser from a bulk supply accommodated in the carriage so as to eliminate any necessity of manual labour being employed in the body of the lorry as is necessary in connection with the arrangements illustrated in Figures 2 and 3. The conveyor 27 is supported upon idle rollers 28 and is driven from the spindle 13 of the vanes 3 in any desired manner, for example by a chain 29 and sprockets 30 and 31, or from a propeller shaft or auxiliary shaft. Preferably there is mounted above the conveyor belt 27 a regulating plate 32, the position of which is adjustable relatively to the conveyor belt 27 so as to control the thickness of the layer of material conveyed by the belt 27 to the vanes 3. Consequently the amount of fertiliser fed to the vanes may be varied and in consequence the amount of material spread over the ground may be regulated in a simple and accurate manner.

Referring to Figures 6 and 7, there is illustrated in Figure 6 a spreader which operates in the same manner as the spreader illustrated in Figure 1 but in which there is provided a brush mechanism 33 designed to even out the flow of the fertiliser to the vanes 3. The brush may be driven in any desired manner, for example by a chain 34 and sprockets 35 and 36 operatively connected to the spindle 13 of the vanes. The brush can be of any desired construction but the arrangement illustrated in Figure 7 is found to give good results and comprises a drum 37 having a series of rigid fingers 38 extending radially therefrom.

The operation of the spreaders illustrated in Figures 1 and 6 is as follows:

The material having been fed from the carriage into a hopper having a capacity, for example of about two hundred weights, will automatically fall under the influence of gravity down the adjustable side wall 5 which is hinged on the front of the hopper. When the material slides off the side wall 5 it falls from the discharge end of the hopper into the path of a series of rotating vanes 3, which as the flow of fertiliser is moving downwardly are moving upwardly from the direction of the horizontal plane C—C extending through the rotational axis of the vanes. The vanes when they meet the flow of fertiliser are travelling in a direction transverse to the direction of flow of the fertiliser and strike the same with a greater or less force, depending upon the speed of rotation of the vanes. The vanes are preferably rotated at a speed of about 600 revolutions per minute but the speed can be increased, if necessary up to 1,200 revolutions per minute.

With the vanes travelling at a speed of rotation of between 600 and 1200 revolutions per minute it will be found that the fertiliser is struck a blow of fairly considerable force which tends to break up any lumps that may be left after the fertiliser has passed through the hopper.

It will be observed from Figures 1 and 6 that the vanes 3 when rotating will strike any material falling through the mouth 4 of the hopper and throw the same outwardly and slightly upwardly. The material so thrown will give a fairly even spread over a distance of twenty five feet or more depending on whether the speed of rotation of the vanes 3 is 600 revolutions per minute or more.

In the case of the arrangement illustrated in Figures 4 and 5, the hopper 1 is dispensed with but the operation of the vanes 3 is the same.

The chamber housing the vanes is preferably so designed that the vanes create a sucking action upon the mouth 4 of the feeding mechanism which helps to draw the material out of the mechanism and the force of the outward draft at the top of the vanes 3 will be found to be sufficient to spread the finer material and consequently by means of these two methods preferably in conjunction with the brush 33 there is provided a fairly even spread of fertiliser upon the area over which the fertiliser is thrown.

In the case of a machine where the fertiliser is spread over the surface of the ground by feeding the fertiliser direct from the carriage to the vanes by means of a conveyor belt, the human element is to a large extent dispensed with, thus obviating a recognised labour difficulty owing to the detrimental effect of such fertilisers as lime have upon the health of persons employed in spreading them. Further as the feed of fertiliser can be regulated so as to effect even distribution the land is uniformly treated whereas when the feed is dependent upon the human element areas are liable to be missed and the fertilisation of the soil become patchy.

The power drive for the spreader may be taken off the engine flywheel by a friction drive in the case of an open flywheel type of engine, whereas in other vehicles the drive can be taken from the gear box or propeller shaft. The simpler method has been found to employ the friction drive.

The quantity of fertiliser discharged per hour from the machine depends upon the area of the discharge end of the feeding mechanism and the speed of rotation of the vanes, whilst with a conveyor belt the quantity discharged depends within limits upon the rate of feed from the belt to the vanes.

With a spreader having vanes eighteen inches wide and having the free end of the side wall 5 (Figure 1) displaced 2" from the back wall 5ª of the hopper, it has been found that 15 tons of fertiliser can be thrown through the opening 16 from the spreader in each hour with vanes measuring eighteen inches by four inches mounted upon a cylinder of ten inches in diameter rotating at 600 revolutions per minute.

It will be appreciated that the quantity of fertiliser spread per hour may be increased by increasing the radius of the cylinder and/or the size of the vanes and/or the mouth of the feeding mechanism and/or the speed of rotation of the vanes.

Thus, it will be seen that according to the present invention there is provided a spreader for fertilisers which is simple in its construction, efficient in its operation and which forms a simple attachment to a vehicle so as to permit the same to be employed not only in its recognised capacity but also as a highly efficient distributor of such fertilisers as lime.

Further it will be appreciated that when a spreader for a fertiliser operating upon the principle of the spreader hereinbefore set forth is incorporated in a carriage there is provided a machine for distributing such fertilizers as lime which ensures that the fertiliser is spread evenly and effectively over a wide area in comparatively short space of time, obviating in its preferred embodiment a considerable amount of manual labour.

What I claim as my invention and desire to secure by Letters Patent of the United States is:

1. A fertilizer spreader attachment for vehicles comprising a casing including front, rear and side walls, said front wall having a discharge opening through the upper portion thereof, means for detachably mounting the casing on a side of a vehicle with said discharge opening directed outwardly from the side of the vehicle, a series of coaxial vanes rotatably mounted in the lower part of said casing and extending between the side walls thereof, a feeding mechanism arranged to receive a charge of fertiliser, for example lime, and deliver the same downwardly through a mouth arranged above and parallel to the axis of rotation of the vanes and at a position adjacent to the path of the free coaxial edges of the vanes but at a greater radial distance from the rotational axis of the said vanes than the said free coaxial edges, the said discharge opening being arranged above the level of the said axis, and means for driving the said vanes in a direction of rotation in which each vane moves from a lower to a higher level as the vane contacts with a flow of fertiliser issuing from the mouth of the feeding mechanism and discharges the fertiliser through said discharge opening in a direction transverse to the direction of travel of the vehicle onto the surface adjacent the side of said vehicle.

2. A fertilizer spreader attachment for vehicles comprising a casing including front, rear and side walls, said front wall having a discharge opening through the upper portion thereof, means for detachably mounting the casing on a side of a vehicle with said discharge opening directed outwardly from the side of the vehicle, a series of rotatable coaxial vanes mounted in the lower portion of said casing and extending between the side walls thereof, a feeding mechanism arranged to receive a charge of fertiliser, for example lime, and deliver the same downwardly through a mouth arranged above and parallel to the axis of rotation of the vanes and at a position adjacent to the path of the free coaxial edges of the vanes but at a greater radial distance from the rotational axis of the said vanes than the said free coaxial edges, the said discharge opening being arranged above the level of the said axis, and means for driving the said vanes whereby each vane meets the fertiliser above a horizontal plane extending through the rotational axis of the vanes and discharges the fertiliser through the discharge opening from above said plane and in a direction transverse to the direction of travel of the vehicle onto the surface adjacent the side of said vehicle.

3. A fertilizer spreader attachment for a motor vehicle comprising a casing including front, rear and side walls, said front wall having a discharge opening through the upper portion thereof, a series of coaxial vanes rotatably mounted in said casing, a feeding mechanism carried by said casing arranged to receive a charge of fertiliser, for example lime, and deliver the same downwardly through a mouth arranged above and parallel to the axis of rotation of the vanes and at a position adjacent to the path of the free coaxial edges of the vanes but at a greater radial distance from the rotational axis of the said vanes than the said free coaxial edges, the said discharge opening being arranged above the level of the said axis, means for detachably mounting the said casing upon a side of a motor propelled vehicle, and means for driving the said vanes from the motor of the said vehicle in a direction of rotation in which each vane moves from a lower to a higher level as the vane contacts with a flow of fertiliser issuing from the mouth of the feeding mechanism and discharges the fertiliser through said discharge opening in a direction transverse to the direction of travel of the motor vehicle onto the space adjacent the side of said vehicle.

4. A fertilizer spreader attachment for vehicles as defined in claim 1 wherein the means for detachably mounting the casing on the side of a vehicle is associated with the rear wall of the casing.

5. A fertilizer spreader attachment for vehicles as defined in claim 1 wherein the means for detachably mounting the casing on the side of a vehicle comprises overhanging portions at the upper edge of the rear wall of the casing for engagement with the side of the vehicle.

H. C. JOHNSON.

REFERENCES CITED

The following references are of record in the file of this patent:

UNITED STATES PATENTS

| Number | Name | Date |
|---|---|---|
| 1,464,621 | Kemp | Aug. 14, 1923 |
| 1,669,693 | Claar | May 15, 1928 |
| 951,073 | Hicks | Mar. 1, 1910 |
| 964,853 | Echols | July 19, 1910 |

FOREIGN PATENTS

| Number | Country | Date |
|---|---|---|
| 654,178 | Germany | Dec. 13, 1937 |
| 41,555 | Denmark | Jan. 27, 1930 |